United States Patent [19]

Takahashi

[11] Patent Number: 4,495,831
[45] Date of Patent: Jan. 29, 1985

[54] SHIFT FORK

[75] Inventor: Kotei Takahashi, Yokohama, Japan

[73] Assignee: Nissan Motor Company, Limited, Japan

[21] Appl. No.: 618,759

[22] Filed: Jun. 8, 1984

Related U.S. Application Data

[63] Continuation of Ser. No. 350,385, Feb. 19, 1982, abandoned.

[30] Foreign Application Priority Data

Feb. 20, 1981 [JP] Japan ................................. 56-22892

[51] Int. Cl.³ .......................... G05G 3/00; F16D 13/58
[52] U.S. Cl. ............................... 74/473 R; 192/82 R; 192/113 R
[58] Field of Search ............................ 74/473 R, 467; 192/82 R, 99 A, 113 R

[56] References Cited

U.S. PATENT DOCUMENTS 4,238,012 12/1980 Takiguchi ..................... 192/82 R X

FOREIGN PATENT DOCUMENTS 2127363 12/1971 Fed. Rep. of Germany .... 192/82 R
2361474 6/1974 Fed. Rep. of Germany .... 74/473 R
408547 1/1945 Italy ................................. 74/473 R
535394 3/1973 Switzerland .
1183140 3/1970 United Kingdom .

Primary Examiner—Allan D. Herrmann
Attorney, Agent, or Firm—Lowe, King, Price & Becker

[57] ABSTRACT

A shift fork in a transmission has an upwardly extending branch whose upper end is bevelled to introduce dripping lubricant to sliding surfaces of the shift fork branch in contact with a collar with which the shift fork is engaged for shifting gears in the transmission.

2 Claims, 5 Drawing Figures

SHIFT FORK

This application is a continuation of application Ser. No. 350,385 filed Feb. 19, 1982, now abandoned.

BACKGROUND OF THE INVENTION

1. Field of the Invention

The present invention relates in general to a shifting mechanism for an automotive vehicle and more particularly to shift forks utilized therein.

2. Description of the Prior Art

FIG. 4 shows a prior art shifting mechanism for an automotive transmission with parts removed to better illustrate the portion with which the present invention is concerned.

In the drawing, 10 is a transmission case, 12 a shaft, 14 a collar mounted on the shaft 12, 16 a shift fork and 18 a fork rod located at the lower part of the shift fork 16.

In the above structure, dropping or dripping oil 20 for lubrication of the sliding surfaces of the tip 16a of the shift fork 16 and the collar 14 tends to come down along the course indicated by the arrow A in the drawing since the shift fork 16 is so constructed and arranged to have a branch whose upper end face 16b is normal to the collar-engaging surface of the tip 16a, resulting in that the amount of lubricant for the sliding surfaces of the shift fork tip and the collar becomes insufficient.

SUMMARY OF THE INVENTION

In accordance with the present invention, there is provided a novel and improved shifting mechanism for an automotive transmission which comprises a collar and a shift fork engaging the collar for shifting the gears in the transmission. The shift fork has a pair of upwardly extending branches. At least one of the shift fork branches has an upper end which is bevelled so that dropping lubricant is effectively introduced to the engaging portions of the collar and the shift fork.

The above structure, though it is quite simple, produces a practically quite useful effect, that is, it enables the sliding portions of the collar and the shift fork to be lubricated sufficiently and assuredly.

It is accordingly an object of the present invention to provide a novel and improved shifting mechanism for an automotive transmission which can assuredly introduce a sufficient amount of lubricant to the sliding portions of a collar and a shift fork engaging the collar.

It is another object of the present invention to provide a novel and improved shifting mechanism of the above mentioned character which is particularly suited for adoption to transaxles for front wheel drive vehicles.

BRIEF DESCRIPTION OF THE DRAWINGS

The features and advantages of the shifting mechanism according to the present invention will become more clearly appreciated from the following description taken in conjunction with the accompanying drawings, in which.

DESCRIPTION OF THE PREFERRED EMBODIMENT

Figure 1:
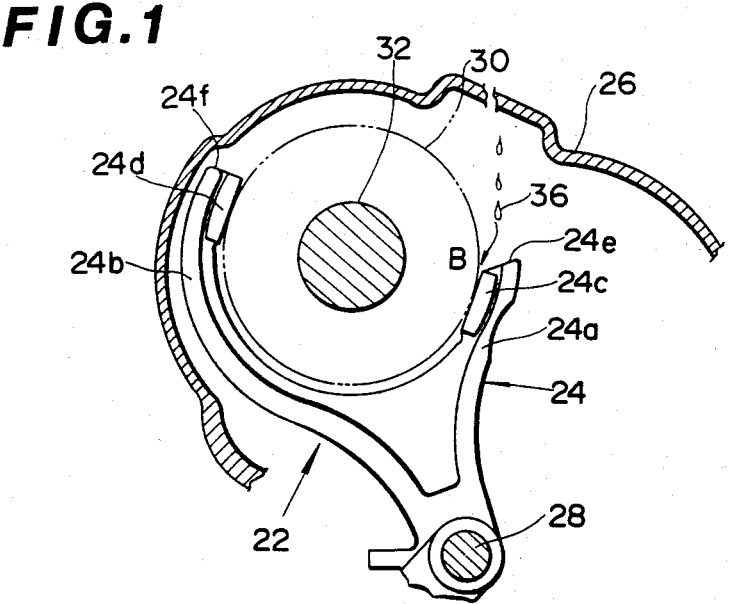
FIG. 1 is a fragmentary section of a shifting mechanism for an automotive transmission according to the present invention with parts removed to better illustrate the invention.
Figure 2:
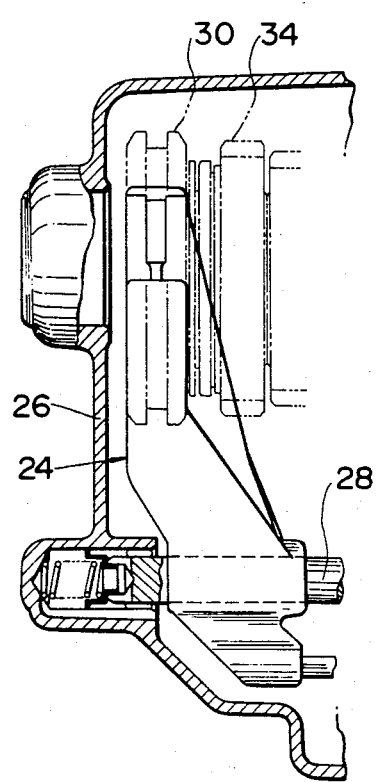
FIG. 2 is a side elevation, in section, of the transmission of FIG. 1.
Figure 3A:
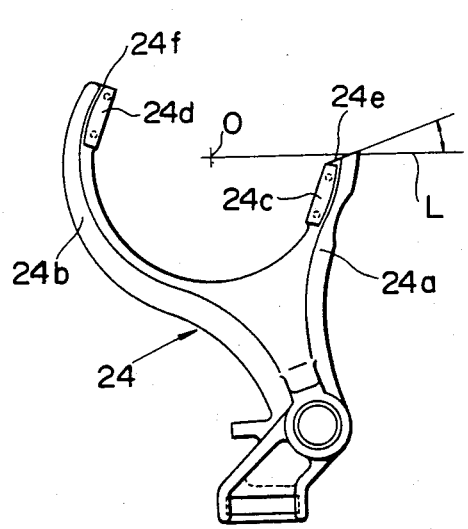
FIG. 3A is a front elevation of a shift fork utilized in the shifting mechanism of the present invention.
Figure 3B:
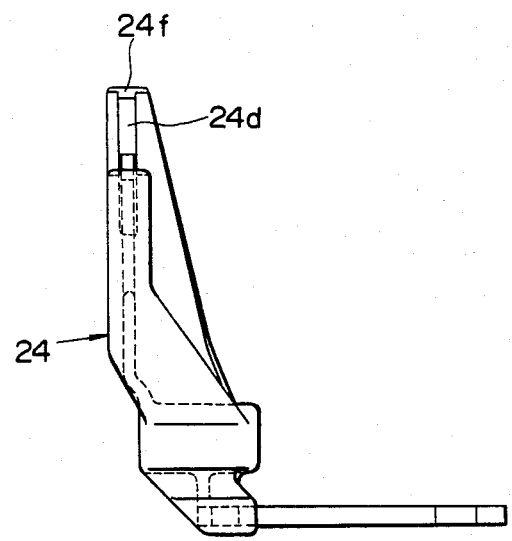
FIG. 3B is a side elevation of the shift fork of FIG. 3A.
Figure 4:
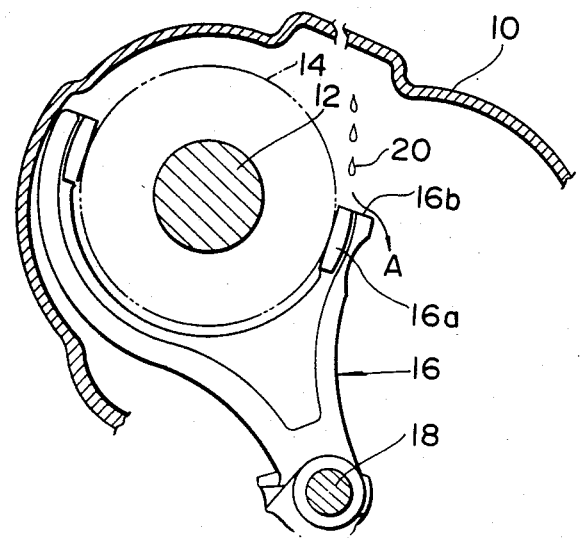
FIG. 4 is a fragmentary section of a prior art shifting mechanism for an automotive transmission with parts removed to better illustrate the portion with which the present invention is concerned.

Referring to FIGS. 1 to 3A and 3B, inclusive, a shifting mechanism for an automotive transmission according to the present invention is generally indicated at 22 and is of the type for use in a front wheel drive vehicle.

The shifting mechanism 22 is shown to include a shift fork 24 disposed within a transmission case 26. The shift fork is carried at the lower part thereof by a fork rod 28 and engages a coupling sleeve or collar 30 which constitutes part of a synchronizer and is slidably mounted on a shaft 32 for shifting the gears in the transmission. A gear 34 is also mounted on the shaft 32 in a manner to be releasably coupled with the shaft 32 to rotate together therewith by way of the synchronizer including the collar 32. The shift fork 24 has upwardly extending forked branches 24a and 24b which are provided with tips 24c and 24d made of a suitable synthetic resinous material, such as nylon. The shift fork is adapted to engage collar 30 via tips 24c, 24d.

In accordance with the present invention, shift fork branch 24 has an upper terminal end face 24e inclined downwardly towards coupling sleeve 30 so that dropping or dripping lubricant 36, i.e., lubricating oil dropping from an oil dripping device (not shown) provided to an upper part of the transmission case 26 is effectively introduced to the sliding surfaces of the shift fork tip 24c and the collar 30. In other words, the upper end face 24e slants towards the collar-engaging surface of the tip 24c or the upper end face is inclined in a manner to descend toward the collar 30. More specifically, as seen from FIG. 3A, the upper edge 24e of the shift fork branch 24a is bevelled to form an angle of $\alpha$ with reference to the horizontal line L passing through the center O of the collar 30. By the effect of the slanting of the end face 24e, lubricating oil 36 dropping from the upper part of the transmission case 26 comes down along the course indicated by the arrow B in FIG. 1 and is effectively introduced to the sliding surfaces of the tip 24c and the collar 30.

The other shift fork branch 24b has an upper terminal end face 24f which is normal to the collar-engaging surface of the tip 24d. However, the end face 24f is arranged so as to decline inwardly of the shift fork so that lubricating oil is introduced to the sliding surfaces of the tip 24d and the collar 30, thus causing no problem on the lubrication. When, however, the shift fork 24b modified in the manner similar to the branch 24a, lubricant may be introduced more effectively to the sliding surfaces.

Obviously, many variations and modifications of the present invention are possible in light of the above teachings. It is, therefore, to be understood that within the scope of the appended claims, the invention may be practiced otherwise than as specifically described.

What is claimed is:

1. A shifting mechanism in an automotive transmission comprising a collar and a shift fork having a pair of upwardly extending forked branches engaging said collar for shifting the transmission, at least one of said branches having an upper end located radially outward from the collar and which is bevelled along substantially entirely an upper end face thereof so as to be inclined downwardly toward said collar so that lubricant dripping downward from a position vertically offset and radially outward from the collar is introduced to portions of said collar engaging with said shift fork by dripping onto said bevelled upper end of the shift fork branch to flow therealong to the collar.

2. A shifting mechanism as set forth in claim 1, wherein each shift fork branch includes at said upper end thereof a tip made of a synthetic resinous material, said upper ends engaging said collar through said tips.

* * * * *